Patented Sept. 24, 1946

2,408,127

UNITED STATES PATENT OFFICE 2,408,127

CONDENSATION PROCESS

George W. Seymour and Victor S. Salvin, Cumberland, Md., assignors to Celanese Corporation of America, a corporation of Delaware No Drawing. Application June 12, 1943, Serial No. 490,674

14 Claims. (Cl. 260—635)

1

This invention relates to the preparation of organic compounds and relates more particularly to the preparation of unsaturated aldehydes and ketones which may be converted to valuable hydroxy and polyhydroxy compounds by hydrogenation reactions.

An object of our invention is to provide a novel process for the preparation of long-chain unsaturated aldehydes and ketones of high molecular weight in a simple and economical manner.

Another object of our invention is the provision of a novel process for the preparation of unsaturated aldehydes and ketones of high molecular weight by condensation reactions whereby the molecular weights reached by said compounds during condensation may be controlled.

A further object of our invention is the production of valuable hydroxy and polyhydroxy compounds from unsaturated aldehydes and ketones of high molecular weight by hydrogenation reactions.

Other objects of our invention will appear from the following detailed description.

It has previously been proposed to produce high molecular weight, long-chain, unsaturated aldehydes and ketones by condensing, with substantially any aldehyde, aldehydes or ketones containing at least one reactive methylene or methyl group, or mixtures of such aldehydes and ketones, in the presence of secondary amines or their salts, under substantially anhydrous conditions. In accordance with the processes heretofore employed, the water formed during the condensation is removed from the reaction mixture at the rate at which it is formed by continuous azeotropic distillation of the reaction mixture as the condensation proceeds. The products formed by these processes are of rather high average molecular weight and are largely solids. When catalytically hydrogenated to yield the corresponding long-chain alcohols, the products obtained are mainly mono-hydroxy alcohols and, similar to the aldehydes and ketones from which they were prepared, are mainly solids of fairly high molecular weight. By the above procedure it is not possible to control the type of products which are produced. As long as reactive aldehyde or ketone is present in the reaction mixture the carbon chains grow longer and longer as the reaction proceeds.

We have now discovered a method whereby the type of products produced in a condensation reaction such as set out above may be carefully controlled. In accordance with our invention, this degree of control may be achieved if said condensation reaction is carried out in the presence of water and a lower aliphatic alcohol as well as the water formed in the course of the condensation reaction, which water is permitted to remain therein throughout the duration of the reaction. Our novel process affords an effective control of the length of the carbon chain of the unsaturated aldehydes and ketones produced, whereby the resulting compounds are preponderantly liquid. Furthermore, when catalytically hydrogenated, long-chain aldehydes and ketones produced by our novel process yield a substantial proportion of valuable polyhydroxy alcohols.

Suitable aldehydes or ketones which may be condensed to yield these valuable long-chain, unsaturated aldehydes and ketones in accordance with our novel process, are, as stated, those aldehydes or ketones containing a reactive methyl or methylene group. Such reactive methyl or methylene groups are those which are either adjacent to an unsaturated aliphatic double bond as in the linkage, R—CH$_2$—CH=CH, or those adjacent to the carbonyl group as in the linkage,

In the above linkages where R is a hydrogen atom, the compounds contain a reactive methyl group and where R is an aliphatic, aromatic, cycloaliphatic, or aliphatic-aromatic radical the compounds contain a reactive methylene group. The aldehydes and ketones which contain a reactive methyl or methylene group may be condensed with each other as well as with aldehydes and ketones which do not contain a reactive methyl or methylene group. The reactive methyl or methylene group of the compounds employed in accordance with our invention condenses with the carbonyl group of the aldehyde or ketone and water is split off.

Any suitable aldehyde or ketone containing a reactive methyl or methylene group may be employed in accordance with our invention. The aldehyde or ketone may be of the aliphatic series or may be any suitable aromatic, aliphatic-aromatic or cycloaliphatic aldehyde or ketone. Examples of said aldehydes or ketones are acetaldehyde, propionaldehyde, acetone, methyl ethyl ketone, diethyl ketone, butylaldehyde, secondary butylaldehyde, 2-hexenal, citral, octyl aldehyde, methyl amyl ketone, methyl isobutyl ketone, oleyl aldehyde, phenyl acetaldehyde, acetophenone, cyclohexyl acetaldehyde, tetrahydrophenyl acetaldehyde, methyl cyclohexyl ketone, ionone, and 4- phenyl-2-butenal, while examples of aldehydes and ketones which do not contain a reactive methyl or methylene group are glyoxal, benzaldehyde, and cinnamic aldehyde. The aldehydes and ketones may also contain substituents such as halogen or hydroxy groups.

The secondary amines or their salts suitable for use as catalysts to aid the condensation reaction may be aliphatic secondary amines such as dimethyl amine, diethyl amine, dipropyl amine, dibutyl amine, or cycloaliphatic amines such as dicyclohexyl amine. Especially valuable catalysts for the condensation reaction are the salts of heterocyclic secondary amines such as, for example, piperidine, piperazine, hydrogenated quinolines, hydrogenated thiazines, morpholine and tetrahydro-pyrrole. Advantageously, the secondary amines are employed in the form of the salts of carboxylic acids such as, acetic acid, formic, succinic acid, crotonic acid, valeric acid, substituted aliphatic acids, viz, glycollic acid, chlorpropionic acid or malic acid, or of weak inorganic acids, such as, boric acid. Preferably we employ the acetic acid salt of morpholine or piperidine as catalyst.

As lower aliphatic alcohols which may be present during the condensation reaction there may be mentioned methyl alcohol, ethyl alcohol, propyl alcohol, isopropyl alcohol and butyl alcohol.

The temperature at which the condensation may be carried out may vary depending upon the reactants employed. Generally, we have found that temperatures of from 40 to 60° C. are satisfactory. The reaction may usually be completed in from 3 to 12 hours depending upon the reactants employed. When condensing crotonaldehyde, for example, optimum results are achieved if the reaction temperature is maintained at about 50° C. and the time of reaction is about 10 hours. Any unreacted aldehyde or ketone may of course be separated from the reaction mixture following the condensation and employed again in subsequent condensation reactions.

The condensation is usually carried out at normal pressure, but reduced pressures or superatmospheric pressure may, in some instances, be advantageous. The condensation may be carried out as a batch process or it may be done in a continuous process.

Preferably, air is excluded during the condensation reaction. The air which is present may be removed, conveniently, by passing a current of nitrogen or other inert gas through the system until all of the air is replaced by said inert gas. The reactants may then be entered into the system and the reaction carried out in the presence of the inert gas.

We have found that the catalyst is preferably present in an amount comprising 1 to 8% on the weight of the aldehyde or ketone.

Water may be added to the reaction medium in an amount of from 10 to 30% on the weight of the aldehyde or ketone, or mixtures thereof, undergoing condensation. Incorporating from ½ to 1½ parts by weight of a lower aliphatic alcohol in this reaction mixture yields a satisfactory medium for the condensation. Where the reactants comprise two different aldehydes, or two different ketones, or a mixture of an aldehyde and a ketone, they may be present in the reaction mixture in substantially molar quantities, although the mol ratio of each aldehyde or ketone may be varied depending upon the type of condensation product desired. Thus, for example, when condensing crotonaldehyde, which condensation yields long-chain high molecular weight polyene aldehydes, optimum results are achieved employing a reaction mixture comprising two parts by weight of crotonaldehyde, one part by weight of methyl alcohol and from 10 to 20%, and preferably about 15% of water, on the weight of the crotonaldehyde. The catalyst employed, preferably morpholine in the form of its acetic acid salt, may be present in an amount of from about 2 to 8%, and preferably about 7% on the weight of the crotonaldehyde.

In carrying out the condensation reaction, the various reactants may be added in any order. The aldehyde or ketone, or mixtures thereof, may be added all at once to a mixture of the alcohol, water and catalyst, or the addition may be made gradually as the reaction proceeds. Preferably, however, we form a mixture of the carbonyl compound, or compounds, together with the water and a part of the alcohol which is to be added, and then, after heating the mixture, adding the catalyst thereto to initiate the reaction. Most advantageously, the catalyst is dissolved in the remainder of the alcohol and the solution is added to the reaction mixture in increments as the reaction proceeds. The amine catalyst may be added as the salt but, preferably, is added in the form of the free base. The acid with which the amine forms the desired salt is added to the reaction mixture prior to the addition of the alcoholic solution of the catalyst and the salt is formed in situ. At the completion of the condensation reaction the long-chain aldehydes and ketones which are formed may be separated in any suitable manner as by fractional distillation under reduced pressure, or by crystallization from various solvents. The products obtained by our novel process are of lower average molecular weight than the long-chain aldehydes and ketones heretofore obtainable by condensation reactions, and are, therefore, of greatly enhanced usefulness especially when hydrogenated to the corresponding mono- and polyhydroxy alcohols.

The unsaturated long-chain aldehydes and ketones may be hydrogenated with hydrogen employing a suitable hydrogenation catalyst, e. g. Raney nickel, and valuable saturated aldehydes and ketone, as well as valuable long-chain mono- and poly-hydroxy alcohols may be obtained.

This hydrogenation may be carried out in a batch process as in a pressure bomb, or the hydrogenation may be carried out by a counter-current absorption method, in which case lower pressures say of the order of 300 lbs. per sq. in. may be used.

The alcohols which may be obtained form valuable anti-foaming agents. When sulfated, the sulfuric acid esters of these alcohols form stable surface active agents or detergents capable of effecting a substantial reduction in the surface tension of water.

In order further to illustrate our invention but without being limited thereto the following example is given:

Example

Into a reaction vessel equipped with a reflux condenser are charged 280 parts by weight of crotonaldehyde, 80 parts by weight of methyl alcohol, 30 parts by weight of water and about 16 parts by weight of acetic acid. The air in the reaction vessel is removed and the surface of the reaction mixture blanketed with an inert gas, nitrogen or $CO_2$. The reaction mixture is heated to 45° C. and 10 parts by weight of morpholine added in solution in about 40 parts by weight of methyl alcohol. The temperature is held at 50° C. for two hours, with reflux, and another 10 parts by weight of morpholine are added together with 40 more parts of methyl alcohol. The reaction mixture is then maintained at 50° C. for eight hours under reflux conditions. The water formed during the course of the reaction is permitted to remain, any vapors being condensed in the reflux condenser and returned to the reaction vessel. At the end of this period, the reaction mixture is a reddish-brown sludge with only a faint odor of crotonaldehyde. The water, methyl alcohol and unreacted crotonaldehyde may be removed under low vacuum and the amines may be removed by washing with a dilute acid solution. The long-chain polyene aldehydes may then be further purified by crystallization from dilute alcohol. The products are obtained in a yield of 74% of theoretical and have an average molecular weight of about 150. Polyene aldehydes, on the other hand, prepared by the process of the prior art under substantially anhydrous conditions have an average molecular weight of about 260.

The long-chain polyene aldehydes may then be hydrogenated, if desired, to the corresponding long-chain monohydroxy and polyhydroxy alcohols. The hydrogenation is carried out by charging 175 parts by weight of the polyene aldehydes, 400 parts by weight of methyl alcohol and 25 parts by weight of Raney nickel into a hydrogenation bomb under 1500 to 1800 lbs. per sq. inch hydrogen pressure and then gradually raising the temperature in a stepwise manner. The temperature is maintained at 50° C. for three hours, at 100° C. for three hours, and finally at 130° C. for three hours. The nickel is filtered from the almost colorless hydrogenation mixture obtained and the solvent distilled off. The crude alcohols may then be fractionated into the several components. The hydroxyl values of the alcohols obtained indicate that a fairly high proportion of polyhydroxy alcohols are formed on hydrogenation of the polyene aldehydes and ketones formed in accordance with our novel condensation process.

When the crude alcohols are sulfated at 15° C. with 110% of chlorosulfonic acid and then neutralized with caustic soda, the product obtained is a brown, waxy solid possessing valuable wetting, detergent and emulsifying properties. When employed in aqueous solution, the latter containing 0.5% by weight of the neutralized sulfated alcohols, the solution shows a lowering of the surface tension to a point substantially below that which is obtained with solutions containing 0.5% by weight of sulfated lauryl alcohol. This novel sulfated product yields abundant suds in water, which suds are stable for 24 hours, does not precipitate or lose its detergent properties in acid solution, and does not precipitate in hard water or in water containing 15% by weight of salt.

It is to be understood that the foregoing detailed description is given as merely by way of illustration and that many variations may be made therein without departing from the spirit of our invention.

Having described our invention, what we desire to secure by Letters Patent is:

1. Process for the production of high molecular weight polyene aldehydes, which comprises subjecting crotonaldehyde to a condensation reaction in a reaction medium comprising water, a lower aliphatic alcohol and a condensation catalyst comprising a member of the group consisting of secondary amines and salts thereof, the water produced by said condensation reaction being maintained in the reaction medium during the course of said reaction.

2. Process for the production of high molecular weight polyene aldehydes, which comprises subjecting crotonaldehyde to a condensation reaction in a reaction medium comprising water, a lower aliphatic alcohol and a condensation catalyst comprising a salt of a secondary heterocyclic amine, the water produced by said condensation reaction being maintained in the reaction medium during the course of said reaction.

3. Process for the production of high molecular weight polyene aldehydes, which comprises subjecting crotonaldehyde to a condensation reaction in an inert, oxygen-free atmosphere and in a reaction medium comprising water, a lower aliphatic alcohol and a condensation catalyst comprising a salt of a secondary heterocyclic amine, the water produced by said condensation reaction being maintained in the reaction medium during the course of said reaction.

4. Process for the production of high molecular weight polyene aldehydes, which comprises subjecting crotonaldehyde to a condensation reaction in a reaction medium comprising water, a lower aliphatic alcohol and a condensation catalyst comprising the acetic acid salt of morpholine, the water produced by said condensation reaction being maintained in the reaction medium during the course of said reaction.

5. Process for the production of high molecular weight polyene aldehydes, which comprises subjecting crotonaldehyde to a condensation reaction in a reaction medium comprising water, methyl alcohol and a condensation catalyst comprising the acetic acid salt of morpholine, the water produced by said condensation reaction being maintained in the reaction medium during the course of said reaction.

6. Process for the production of high molecular weight polyene aldehydes, which comprises subjecting crotonaldehyde to a condensation reaction in an inert, oxygen-free atmosphere and in a reaction medium comprising water, methyl alcohol and a condensation catalyst comprising the acetic acid salt of morpholine, the water produced by said condensation reaction being maintained in the reaction medium during the course of said reaction.

7. Process for the production of high molecular weight polyenealdehydes, which comprises subjecting crotonaldehyde to a condensation reaction in a reaction medium comprising from 10 to 30% of water on the weight of the crotonaldehyde, from ½ to 1½ parts by weight of a lower aliphatic alcohol, and from 2 to 8% of a condensation catalyst comprising the acetic acid salt of morpholine, the water produced by said condensation reaction being maintained in the reaction medium during the course of said reaction.

8. Process for the production of higher molecular weight mono- and poly-hydroxy alcohols, which comprises subjecting crotonaldehyde to a condensation reaction in a reaction medium comprising water, a lower aliphatic alcohol and a condensation catalyst comprising a member of the group consisting of secondary amines and salts thereof, the water produced by said condensation reaction being maintained in the reaction medium during the course of said reaction, and subjecting the compounds thereby obtained to hydrogenation.

9. Process for the production of higher molecular weight mono- and poly-hydroxy alcohols, which comprises subjecting crotonaldehyde to a condensation reaction in a reaction medium comprising water, a lower aliphatic alcohol and a condensation catalyst comprising the acetic acid salt of morpholine, the water produced by said condensation reaction being maintained in the reaction medium during the course of said reaction, and subjecting the compounds thereby obtained to hydrogenation.

10. Process for the production of higher molecular weight mono- and poly-hydroxy alcohols, which comprises subjecting crotonaldehyde to a condensation reaction in a reaction medium comprising from 10 to 30% of water on the weight of the crotonaldehyde, from ½ to 1½ parts by weight of a lower aliphatic alcohol and from 2 to 8% of a condensation catalyst comprising the acetic acid salt of morpholine, the water produced by said condensation reaction being maintained in the reaction medium during the course of said reaction, and subjecting the compounds thereby obtained to hydrogenation.

11. Higher molecular weight mono- and poly-hydroxy alcohols prepared by subjecting crotonaldehyde to a condensation reaction in a reaction medium comprising water, a lower aliphatic alcohol and a condensation catalyst comprising a member of the group consisting of secondary amines and salts thereof, the water produced by said condensation reaction being maintained in the reaction medium during the course of said reaction, and subjecting the compounds thereby obtained to hydrogenation.

12. Higher molecular weight mono- and poly-hydroxy alcohols prepared by subjecting crotonaldehyde to a condensation reaction in an inert, oxygen-free atmosphere and in a reaction medium comprising water, a lower aliphatic alcohol and a condensation catalyst comprising a member of the group consisting of secondary amines and salts thereof, the water produced by said condensation reaction being maintained in the reaction medium during the course of said reaction, and subjecting the compounds thereby obtained to hydrogenation.

13. Higher molecular weight mono- and poly-hydroxy alcohols prepared by subjecting crotonaldehyde to a condensation reaction in a reaction medium comprising from 10 to 30% of water on the weight of the crotonaldehyde, from ½ to 1½ parts by weight of a lower aliphatic alcohol, and from 2 to 8% of a condensation catalyst comprising the acetic acid salt of morpholine, the water produced by said condensation reaction being maintained in the reaction medium during the course of said reaction, and subjecting the compounds thereby obtained to hydrogenation.

14. Higher molecular weight mono- and poly-hydroxy alcohols prepared by subjecting crotonaldehyde to a condensation reaction in an inert, oxygen-free atmosphere and in a reaction medium comprising from 10 to 30% of water on the weight of the crotonaldehyde, from ½ to 1½ parts by weight of a lower aliphatic alcohol, and from 2 to 8% of a condensation catalyst comprising the acetic acid salt of morpholine, the water produced by said condensation reaction being maintained in the reaction medium during the course of said reaction, and subjecting the compounds thereby obtained to hydrogenation.

GEORGE W. SEYMOUR.
VICTOR S. SALVIN.